(12) United States Patent
Shizuya et al.

(10) Patent No.: US 7,644,419 B2
(45) Date of Patent: Jan. 5, 2010

(54) OPTICAL DISC APPARATUS

(75) Inventors: Mitsutaka Shizuya, Ryugasaki (JP); Shinya Tsubota, Mito (JP); Yoshiyuki Tanaka, Kawasaki (JP); Sojiro Kirihara, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 517 days.

(21) Appl. No.: 11/668,114

(22) Filed: Jan. 29, 2007

(65) Prior Publication Data

US 2007/0220535 A1 Sep. 20, 2007

(30) Foreign Application Priority Data

Mar. 15, 2006 (JP) ............................. 2006-070144

(51) Int. Cl.
*G11B 33/12* (2006.01)
(52) U.S. Cl. ..................................... 720/652
(58) Field of Classification Search ................. 720/652, 720/649, 648
See application file for complete search history.

(56) References Cited

U.S. PATENT DOCUMENTS

| | | | | |
|---|---|---|---|---|
| 7,421,720 B2* | 9/2008 | Wakabayashi et al. | ...... | 720/649 |
| 7,428,192 B2* | 9/2008 | Ochi et al. | ............... | 369/44.14 |
| 2005/0240949 A1* | 10/2005 | Liu et al. | ..................... | 720/649 |
| 2006/0184951 A1* | 8/2006 | Shizuya et al. | .............. | 720/601 |
| 2007/0150909 A1* | 6/2007 | Fujimoto et al. | ............ | 720/648 |
| 2007/0220534 A1* | 9/2007 | Abe et al. | .................... | 720/649 |

FOREIGN PATENT DOCUMENTS

| | | |
|---|---|---|
| JP | 2005-166218 | 6/2005 |
| JP | 2005-310192 | 11/2005 |
| JP | 2005-322277 | 11/2005 |

\* cited by examiner

*Primary Examiner*—Angel A. Castro
(74) *Attorney, Agent, or Firm*—Antonelli, Terry, Stout & Kraus, LLP.

(57) ABSTRACT

The heat dissipation of a pickup is improved in an optical disc apparatus of a slot-in type.

A unit cover 16 on a disc-facing side of a unit mechanism 6 includes a circumferential plate 21, a lever supporting plate 22, a disc guiding plate 23, a flexible printed circuit board holding plate 24, a reinforcing plate 25, a driving part covering plate 27, ventilating openings near sub guiding shaft 28, an extended notch near sub guiding shaft 30, an outer extended notch 31, and an extended notch near main guiding shaft 32. With this configuration, plenty of air flow induced by the rotation of a disc 5 can be introduced to a pickup 9 also through the unit cover 16, greatly improving heat dissipation capability.

9 Claims, 9 Drawing Sheets

MODEL TEST OUTLINE

MODEL TEST RESULT

OPTICAL DISC APPARATUS

FIELD OF THE INVENTION

The present invention relates to an optical disc apparatus for driving an optical disc medium such as a CD, a DVD or other disc media.

BACKGROUND ART

In conventional optical disc apparatus for personal computers and domestic recorder/player, pickups are liable to be hot because of laser diodes and driving circuits and the like of the laser diodes acting as heat sources. In such a pickup, openings and the like for ventilation are provided in addition to a central opening. The central opening is originally formed in a unit cover disposed on the top of a unit mechanism for storing a pickup, so that disc rotational flows which are air flows induced by disc rotations are guided to the pickup and promote heat dissipation. Examples of this technique are described in patent documents 1 to 3. Optical disc apparatus described in these patent documents include a tray type (patent documents 1 to 3) having a tray wherein a unit mechanism is fixed, protruding to the front of a housing of the apparatus during the mounting/dismounting of a disc, and a top-loading type (patent document 2) of loading and unloading a disc by opening and closing the top cover of the housing of the apparatus. These optical disc apparatus include a unit mechanism which may be exposed outside. In these types, considering a appearance, adherent contaminants, and contact by a user when the unit mechanism is exposed outside, the formation of openings is severely restricted on a part of a unit cover other than the central opening which corresponds to the moving range of the rim of an objective lens for a pickup and a spindle motor for rotating a disc. In the optical disc apparatus of patent document 1, a through hole is provided on a unit cover so as to be placed on a position overlapping the laser driving circuit of a pickup in a plane or placed between a sub guiding shaft and a midpoint between the sub guiding shaft and the objective lens of the pickup, the sub guiding shaft guiding the movement of the pickup. In the optical disc apparatus of patent document 2, a plurality of ventilating holes shaped like a circle, a polygon, a semicircle, a long slit, and so on are provided on a unit cover. In the optical disc apparatus of patent document 3, on a part where the central opening of a unit cover is extended out of a disc mounting area, a tray covering the part has a small thickness at the start in the direction of a disc rotational flow (a large clearance) and has a large thickness on an opening end of the downstream side (no clearances), so that plenty of disc rotational flow is introduced.

[Patent document 1] JP Patent Publication (Kokai) No. 2005-166218
[Patent document 2] JP Patent Publication (Kokai) No. 2005-310192
[Patent document 3] JP Patent Publication (Kokai) No. 2005-322277

SUMMARY OF THE INVENTION

[Problems to be Solved by the Invention]

An optical disc apparatus of the present invention is a slot-in type in which a disc is loaded and ejected at the front of the housing of the apparatus and the disc is automatically transported and then mounted or dismounted by an internal mechanism between the front and an internal unit mechanism. The unit mechanism is placed in the housing and not exposed to the outside. Therefore, unlike the tray-type and so on, the formation of openings on a unit cover is not restricted by the design and so on, so that relatively large openings and the like can be provided. However, when large ventilating openings and the like for promoting heat dissipation are formed on the unit cover of the slot-in type, it is necessary to sufficiently consider the shape of a part to be left as the cover such that enough strength is obtained in addition to functions unique to the slot-in type while smoothly keeping the operations of the internal mechanism for mounting and dismounting a disc and the movement of a disc at the front of a housing. The functions include the prevention of protrusion of an internal flexible printed circuit board when a pickup is moved and the prevention of scattering of grease from a sliding part of a guiding mechanism.

Considering application to the unit cover of an optical disc apparatus of the slot-in type, in patent document 1, a rectangular through hole is formed on a position corresponding to a laser driving circuit and a plurality of through holes are dispersed over a range between the sub guiding shaft and a midpoint between the sub guiding shaft and the objective lens, on the unit cover of the sub guiding shaft on the opposite side from a main guiding shaft to which a driving force for moving a pickup is applied. This configuration cannot specifically achieve compatibility between such large openings and the maintenance of strength and the functions unique to the slot-in type. Further, in patent document 2, a plurality of through holes are provided over the cover irrespective of the position of the main guiding shaft and the sub guiding shaft. This configuration cannot specifically achieve compatibility between such large openings and the maintenance of strength and the functions unique to the slot-in type. In patent document 3, the thickness of a tray facing an enlarged part around the central opening of a unit cover is changed to introduce disc rotational flows. Since no components substituting for the tray of this part are available in the slot-in type, it is difficult to apply the technique of patent document 3 to the slot-in type.

An object of the present invention is to promote heat dissipation of a pickup which is particularly liable to be hot in an optical disc apparatus of the slot-in type, without causing problems in the operations of the apparatus.

[Means of Solving the Problems]

In order to solve the problems, according to the present invention, a unit cover includes: a circumferential plate which extends along the circumference or a part of the circumference of the end face of a disc-facing side of a mechanism chassis and is placed to cover or contact at least a part of the width direction orthogonal to the circumferential direction on each part of the end face of the mechanism chassis, a lever supporting plate disposed to be extended from the circumferential plate such that the lever supporting plate covers a part of the track or the entire track of the outer region of a driving lever moving inside the mechanism chassis in a loading mechanism, the driving lever being disposed between a sub guiding shaft and an objective lens peripheral part of a pickup and on the inner side of a disc, and rotating so as to protrude to the disc-facing side of the unit cover, a disc guiding plate which extends slightly inward from the circumferential plate on a position between the front of the sub guiding shaft and the front of a housing or the objective lens peripheral part of the pickup on the end face of the disc-facing side of the mechanism chassis, the disc guiding plate guiding the disc while sliding the recording surface of the disc in surface contact during loading or ejection of the disc, a flexible printed circuit board holding plate disposed between the sub guiding shaft and the objective lens peripheral part of the pickup and outside of the middle of the radial direction of the disc, the flexible printed circuit board holding plate covering, along the radial direction of the disc with a width smaller than that of a flexible printed circuit board for pickup, a range in which the flexible printed circuit board for pickup is protruded to the disc-facing side by the movement of the pickup, a reinforcing plate for connecting at least one of a pair of the flexible printed circuit board holding plate and the circumferential plate and a pair of the lever supporting plate and the circumferential plate in a direction substantially perpendicular to the moving direction of the pickup and a pair of the flexible printed circuit board holding plate and the disc guiding plate substantially in the moving direction of the pickup, and combining the plates into a cover, and at least one ventilating opening near sub guiding shaft disposed between the sub guiding shaft and the objective lens peripheral part of the pickup, the ventilating openings near sub guiding shaft being disposed in a range of the flexible printed circuit board holding plate and the lever supporting plate in the moving direction of the pickup and in a range from the flexible printed circuit board holding plate or the lever supporting plate substantially to the circumferential plate or the sub guiding shaft in a direction substantially orthogonal to the moving direction of the pickup.

[Effects of the Invention]

It is possible to smoothly keep the operations of the driving lever for mounting/dismounting the disc by using the lever supporting plate of the unit cover, smoothly keep the movement of the disc at the front side of the housing by using the disc guiding plate, prevent the protrusion of a flexible printed circuit board during the movement of the pickup by using the flexible printed circuit board holding plate, prevent scattering of grease from a sliding part by using a driving part covering plate when the sliding part of the guiding mechanism is exposed, and form large openings and the like for ventilation on the unit cover after strength is obtained by the reinforcing plate, by using the ventilating opening near sub guiding shaft, an extended notch near sub guiding shaft added as necessary or an outer extended notch and an extended notch near main guiding shaft. Therefore, as described above, it is possible to introduce a number of disc rotational flow to the pickup being liable to be hot without causing problems in the operations of the optical disc apparatus of the slot-in type, thereby achieving sufficient heat dissipation.

DESCRIPTION OF THE PREFERRED EMBODIMENTS OF THE INVENTION

Embodiments of the present invention will now be described below.

First Embodiment

Referring to FIGS. 1 to 3, an embodiment of an optical disc apparatus according to the present invention will now be described below. FIG. 1 is a plan view showing the overall configuration of the optical disc apparatus without the top cover. FIG. 2 is a sectional view of the optical disc apparatus taken along line C-C of FIG. 1. FIG. 3 is a plan view showing a unit mechanism of the optical disc apparatus. The optical disc apparatus of the present embodiment is called a slot-in type which is slim and mainly adopted in notebook and desktop personal computers. A disc is loaded and ejected at the front of the housing of the apparatus and the disc is automatically transported and then mounted or dismounted by an internal mechanism between the front and the internal unit mechanism.

An optical disc apparatus 1 includes a housing whose top surface is mainly covered with a top cover 2. The bottom, sides, and back of the housing are covered with a bottom cover 3, and the front of the housing is covered with a front panel 4. In the housing, a unit mechanism 6 for mounting a disc 5 above is disposed from the front to the center of the housing, and a circuit board 7 for signal processing and power supply or the like is disposed on the lower part of the back. A frame making up the periphery of the unit mechanism 6 is a mechanism chassis 8. In the mechanism chassis 8, a pickup 9 including a laser diode and a laser driving IC for recording/reproducing information on the disc 5 is provided and a spindle motor 10 for rotating the disc is provided. The pickup 9 includes a pickup driving part 11 for transmitting force to a part of the side of the pickup 9, a main guiding shaft 12 for guiding the movement of the pickup 9, and a sub guiding shaft 13 for guiding the movement of the pickup 9, so that for recording/reproducing information on the disc 5, the pickup 9 can move between the inner side (on the side of the spindle motor 10) and the outer side (at the front the housing of the apparatus) of the radial direction (A direction) of the disc 5. The pickup driving part 11 and the main guiding shaft 12 are disposed on the right side, when viewed from the front side, in the housing of the apparatus where the disc 5 rotates clockwise when viewed from the top. The sub guiding shaft 13 is disposed on the left side, when viewed from the front side, in the housing of the apparatus. Further, on the unit mechanism 6 (disc-facing side), a unit cover 16 is attached which includes a central opening 15 whose range corresponds to the moving range of an objective lens peripheral part 14 (slightly protrudes upward) at the center of the pickup 9 and the rotating part of the spindle motor 10. The unit cover 16 covers the unit mechanism 6 while being contacted and fixed by a mechanism chassis 8.

Moreover, in order to automatically mount and dismount the disc 5 in the optical disc apparatus 1, a loading mechanism is provided which includes a driving lever 17 (normally provided on each of the main and sub guiding shafts and rotated like an arc as indicated by B), a guiding part 18 (disposed on the side of the sub guiding shaft, the front, and so on), and a unit mechanism tilting part 19. The driving lever 17 and the guiding part 18 load or eject the disc 5 by moving between the front of the housing of the apparatus and a part near the spindle motor 10 of the unit mechanism 6 while supporting the outer edge of the disc 5. The unit mechanism tilting part 19 mounts or dismounts the disc 5 on the spindle motor 10 by moving up or down (D direction) the spindle motor of the unit mechanism 6 against the disc 5 placed near the spindle motor 10. Further, a flexible printed circuit board for pickup 20 for connecting the moving pickup 9 and the fixed circuit board 7 is extended from the front side of the pickup 9 through the underside of the pickup 9 to the underside of the sub guiding shaft 13.

During the recording/reproduction of the disc 5, heat is generated on optical systems such as a laser diode and a laser driving IC of the pickup 9, the spindle motor 10, the circuit board 7 and so on in the optical disc apparatus 1. Under some conditions including a recording/reproduction rate, an operating time, and ambient temperature, the heat generation density increases and the temperature of components such as a laser diode in the pickup 9 which is liable to be hot become a temperature equal to or higher than a proof temperature, resulting in problems including a malfunction and a short life of the apparatus. In the optical disc apparatus 1 of the slot-in type, in order to dissipate heat effectively from the pickup 9 being liable to be hot, an opening and the like for ventilation is largely extended on the unit cover 16 and more disc rotational flow introduced into the pickup 9. The optical disc apparatus 1 is advantageous in that the unit mechanism 6 is always disposed in the housing of the apparatus and thus even when an opening or the like is provided on the unit cover 16 in addition to the central opening 15, problems of design and so on do not occur unlike the tray type. Simultaneously, the shape of a part to be left as the cover of the unit cover 16 is properly determined so that the opening and the like added on the unit cover 16 do not adversely affect internal operations unique to the optical disc apparatus 1 of the slot-in type. The following is a characteristic configuration relating to these advantages.

The unit cover 16 of the present embodiment includes a circumferential plate 21 which is disposed on the outer region of the mechanism chassis 8 and comes into contact with the upper end face of the mechanism chassis 8 to support and fix the cover on the mechanism chassis 8, and a lever supporting plate 22 which reduces binding and wobbling of the driving lever 17 and allows the lever to smoothly operate. The lever supporting plate 22 is disposed on a position corresponding to the track of the outer region of the driving lever 17 protruding out of the cover on the side of the sub guiding shaft and the inner side of the moving direction of the pickup (on the side of the spindle motor 10) during the transportation of the disc. Moreover, in a range from the front (the outer side of the disc) of the unit mechanism 6 to the front of the sub guiding shaft, a disc guiding plate 23 is provided inside the circumferential plate 21. A guiding part 18 is attached to the front of the disc guiding plate 23 (the guiding part 18 is mounted continuously from the circumferential plate 21) so as to hold the disc 5 while sliding the recording surface (on the side of the pickup) of the disc 5 during loading and ejection. Further, a flexible printed circuit board holding plate 24 is provided in a range where the flexible printed circuit board for pickup 20 is protruded upward by the movement of the pickup 9, on the side of the sub guiding shaft and near the middle and the outer side (the front side of the unit mechanism) of the moving direction of the pickup. The width of the flexible printed circuit board holding plate 24 is set smaller than that of flexible printed circuit board in order to prevent contact with the disc 5 but is large enough to prevent protrusion. Furthermore, in order to keep a required strength of the cover and combine the plates even when the plates are reduced in width, reinforcing plates 25 are provided on two points on the side of the sub guiding shaft. Additionally, a driving part covering plate 27 extends from the circumferential plate 21 to the inside in such a manner as to prevent scattering of grease on a sliding part 26 of the pickup driving part 11 on the side of the main guiding shaft. A hood part 35 bent diagonally below is formed on the end of the plate to shorten the length of the plate on the side of the pickup 9. The hood part 35 is bend so as not to interfere with the components of the pickup 9 on the side of the pickup driving part 11 (to be specific, to avoid collision or contact on the components of the pickup and prevent interference with the movement of the pickup).

With these plates, even when a large opening and the like for ventilation are formed on the other part of the cover, it is possible to secure the strength of the cover and the function of preventing the internal flexible printed circuit board for pickup 20 from being protruded by the movement of the pickup and preventing grease from scattering from the sliding part 26 of the guiding mechanism, while smoothly keeping the operations of an internal mechanism for mounting/dismounting the disc 5 and the movement of the disc at the front of the housing. The operations of the internal mechanism and the movement of the disc are necessary for the unit cover 16 of the optical disc apparatus 1 of the slot-in type.

While keeping at least these plates, two ventilating openings near sub guiding shaft 28 are further formed on the unit cover 16. The ventilating openings near sub guiding shaft 28 are formed along the flexible printed circuit board holding plate and the lever supporting plate on the side of the sub guiding shaft and extended substantially to the circumferential plate 21 and the sub guiding shaft 13 in a direction perpendicular to the moving direction of the pickup 9. Further, an extended notch near sub guiding shaft 30 and an outer extended notch 31 are formed such that the central opening 15 is extended from a lens rim boundary 29, which corresponds to the moving range of the objective lens peripheral part 14, to the sub guiding shaft or the outer side of the moving direction of the pickup, and an extended notch near main guiding shaft 32 is formed such that the central opening 15 is extended from the lens rim boundary 29 substantially to the circumferential plate 21 and the main guiding shaft 12 on the side of the main guiding shaft. As compared with the case where only the central opening 15 corresponding to the lens rim boundary 29 is formed on the unit cover 16, these large openings and the like make it possible to remarkably increase disc rotational flow induced by the rotation of the disc 5 guided to the pickup 9, and continuously guide the disc no matter where the pickup 9 is placed between the inner side and the outer side of the moving direction, thereby greatly promoting heat dissipation obtained by the convection of the pickup 9.

Therefore, as described above, the present invention makes it possible to introduce, by using the plates and openings and the like provided on the unit cover 16, plenty of disc rotational flow to the pickup being liable to be hot without causing problems in the operations of the optical disc apparatus of the slot-in type, thereby achieving sufficient heat dissipation.

Second Embodiment

Referring to FIG. 4, another embodiment of an optical disc apparatus according to the present invention will be described below. FIG. 4 is a plan view showing a unit mechanism of the optical disc apparatus. Also in the subsequent embodiments, the parts of an optical disc apparatus 1 are indicated by the same reference numerals as those of First Embodiment and different configurations will be mainly described.

Second Embodiment is different from First Embodiment as follows: in a unit cover 16 of the present embodiment, the number of sub guiding shaft ventilating openings 28 is increased to three, a reinforcing recess 34 having a step height as large as the thickness of the cover is provided on a lever supporting plate 22 and a flexible printed circuit board holding plate 24 on the side of a sub guiding shaft and a reinforcing plate 25 on the outer side, and no extended notches are formed on the side of the main guiding shaft. Although the three ventilating openings near sub guiding shaft 28 are provided, the situation in which the opening is extended from the inner side to the outer side of the moving direction of a pickup is substantially the same as that of First Embodiment. The reinforcing recess 34 makes it possible to slightly reduce the widths of the plates while keeping the strengths of the plates where the reinforcing recess part 34 is provided. Therefore, the heat dissipation effect of the unit cover 16 and functions required for the cover are not so different from those of First Embodiment. Although induced disc rotational flow is slightly reduced due to the absence of the extended notch near the main guiding shaft, a deterioration of the heat dissipation effect is limited because the number of heat generating components of a pickup 9 is not large between an objective lens peripheral part 14 and the main guiding shaft. Further, the heat dissipation effect improved by a large opening and the like formed on the side of the sub guiding shaft is originally dominant and effective. Therefore, the overall heat dissipation effect is substantially the same as that of First Embodiment.

As described above, although the configuration of the present embodiment is partially different from that of First Embodiment, the effective plates and openings and the like are obtained on the unit cover 16 as a whole. Thus as in First Embodiment, it is possible to introduce plenty of disc rotational flow to the pickup being liable to be hot without causing problems in the operations of the optical disc apparatus of the slot-in type, thereby achieving sufficient heat dissipation.

Third Embodiment

Referring to FIG. 5, still another embodiment of an optical disc apparatus according to the present invention will be described below. FIG. 5 is a plan view showing a unit mechanism of the optical disc apparatus.

In a unit cover 16 of the present embodiment, only a single ventilating opening near sub guiding shaft 28 is provided from the middle to the outer side of the moving direction of a pickup, and a disc guiding plate 23 is extended inward on the outer side of the moving direction of the pickup. Thus an outer extended notch 31 is not particularly formed. Further, Third Embodiment is different from First Embodiment in that an extended notch near main guiding shaft 32 is extended over a main guiding shaft 12 and a sliding part 26 to a circumferential plate 21 because a cover part 33 is provided on the sliding part 26 of a pickup driving part 11 in addition to the unit cover 16, and the extension of the extended notch near main guiding shaft 32 is limited, for the fixation of the circumferential plate 21, to the outer side of the moving direction of the pickup on the side of the main guiding shaft. Since the ventilating opening near sub guiding shaft 28 is not provided on the inner side and neither is the outer extended notch 31, disc rotational flow introduced to the corresponding parts is slightly reduced. However, disc rotational flow on the inner side is originally less than those of the outer side and disc rotational flow in the middle to the outer region is introduced through the ventilating opening near sub guiding shaft 28 and an extended notch near sub guiding shaft 30 in a similar manner to First Embodiment. Thus a deterioration of the heat dissipation effect is limited. Since an extended notch near main guiding shaft 32 is slightly larger than that of First Embodiment, disc rotational flow introduced from the main guiding shaft is not reduced, so that the heat dissipation effect is improved as in First Embodiment.

As described above, although the configuration of the present embodiment is partially different from that of First Embodiment, the effective plates and openings and the like are obtained on the unit cover 16 as a whole. Thus as in First Embodiment, it is possible to introduce plenty of disc rotational flow to the pickup being liable to be hot without causing problems in the operations of the optical disc apparatus of the slot-in type, thereby achieving sufficient heat dissipation.

Fourth Embodiment

Referring to FIG. 6, still another embodiment of an optical disc apparatus according to the present invention will be described below. FIG. 6 is a plan view showing a unit mechanism of the optical disc apparatus.

Fourth Embodiment is different from First Embodiment as follows: in a unit cover 16 of the present embodiment, a ventilating opening for sub guiding shaft 28 is divided into eight, a lever supporting plate 22 and a flexible printed circuit board holding plate 24 near a sub guiding shaft and a reinforcing plate 25 on the outer side are increased in width, openings 36 smaller than the ventilating openings near sub guiding shaft 28 are formed, and an extended notch near sub guiding shaft 30 is not particularly formed. Although the sub guiding shaft ventilating opening 28 is divided into a plurality of openings, the situation in which the opening is extended from the inner side to the outer side of the moving direction of a pickup is substantially the same as that of First Embodiment. The opening area and ventilation can be substantially the same as those of First Embodiment. Although the lever supporting plate 22 and the flexible printed circuit board holding plate 24 are increased in width, because of the presence of the small openings 36, ventilation around the plates is the same as that of First Embodiment in which the width is small but the extended notch near sub guiding shaft 30 is provided. On the other hand, since the lever supporting plate 22 and the flexible printed circuit board holding plate 24 have large widths, the functions of the parts acting as covers become somewhat advantageous. Therefore, the heat dissipation effect of the unit cover 16 and the functions required for the cover are not so different from those of First Embodiment.

As described above, although the configuration of the present embodiment is partially different from that of First Embodiment, the effective plates and openings and the like are obtained on the unit cover 16 as a whole. Thus as in First Embodiment, it is possible to introduce plenty of disc rotational flow to the pickup being liable to be hot without causing problems in the operations of the optical disc apparatus of the slot-in type, thereby achieving sufficient heat dissipation.

Fifth Embodiment

Referring to FIGS. 7 to 9, still another embodiment of an optical disc apparatus according to the present invention will be described below. FIG. 7 is a bottom view showing a unit mechanism of the optical disc apparatus. FIG. 8 is a partial side sectional view (E-E sectional view) of the optical disc apparatus. FIG. 9 is an explanatory drawing showing a model test of a noncontact radiator plate according to the present invention.

In the present embodiment, a unit cover 16 has the same shape as that of First Embodiment, a partial under cover 37 is mounted to be fixed on a mechanism chassis 8 such that the partial under cover 37 comes close to the underside of a pickup 9 in a noncontact manner under the unit mechanism 6 (the opposite side from a disc-facing side) and on the outer side of the moving direction of the pickup. The partial under cover 37 is placed such that even when a spindle motor 10 of the unit mechanism 6 is moved down by a loading mechanism, the underside of the partial under cover 37 near the middle of the moving direction of the pickup does not strongly come into contact with a bottom cover 3 of the housing of the apparatus. In the conventional slot-in type optical disc apparatus 1, unlike a tray-type apparatus, the unit mechanism 6 does not protrude outside the housing of the apparatus. Thus an under cover for covering the underside of the unit mechanism 6 is not provided. Further, a clearance between the underside of the pickup 9 and the bottom cover 3 is about 1 mm during an operation of the apparatus. The relatively large clearance is set because the unit mechanism 6 is tilted by the loading mechanism. In this embodiment, in addition to the heat dissipation effect obtained by the convection of the opening and the like of the unit cover 16, a heat dissipation effect is obtained also on the underside of the pickup 9 by using the effect of a noncontact radiator plate for promoting heat dissipation. The above clearance is reduced by adding the partial under cover 37 closer than the bottom cover 3, so that heat dissipation can be promoted by the thermal conduction of a thin air layer and the action of radiation to the partial under cover 37.

FIG. 9 shows the outline of the model test for verifying the effect of the noncontact radiator plate which dissipates heat in a noncontact manner like the pickup 9 and the partial under cover 37. In this model test, a heat generating plate corresponds to the pickup and a radiator plate corresponds to a noncontact radiator plate (the partial under cover in this embodiment). Dimensions and materials are selected from the assumed range of an actual apparatus. In a test result, when a clearance from the radiator plate is about 7 mm or larger, the heat generating plate has a high temperature because of little heat dissipation of natural convection or radiation to a wide space, whereas when the clearance is smaller than 7 mm, radiation first increases and then thermal conduction through an air layer increases, so that heat dissipation from the heat generating plate to the radiator plate increases, the temperature of the heat generating plate rapidly drops, and the temperature of the radiator plate gradually increases at a rate corresponding to an area ratio. In the optical disc apparatus 1 of the slot-in type, when the partial under cover is not provided, a clearance to the bottom cover opposed to the pickup is about 1 mm. Since it can be considered that the clearance to the partial under cover opposed to the pickup can be reduced to about 0.3 mm to 0.6 mm by adding the partial under cover, the temperature of the pickup (heat generating plate) can be reduced by 2° C. to 5° C. This result is an example of tested specifications and may vary with materials and sizes. However, this result proves that when proper specifications are selected, excellent heat dissipation can be obtained by a noncontact radiator plate.

As described above, the present embodiment is different from First Embodiment in that the partial under cover 37 is additionally provided. The same heat dissipation effect as that of First Embodiment can be obtained with the same plates and openings and the like on the unit cover 16, and the heat dissipation effect of the partial under cover is further obtained. Thus as in First Embodiment, it is possible to sufficiently dissipate heat of the pickup being liable to be hot by using thermal conduction and the action of radiation as well as convection, without causing problems in the operations of the optical disc apparatus of the slot-in type, thereby achieving sufficient heat dissipation.

The present invention was described in accordance with the foregoing embodiments. The present invention is not limited to these embodiments and thus another embodiment may be applicable. For example, when an area for ventilation is obtained, the ventilating openings near sub guiding shaft may be formed from the flexible printed circuit board holding part or the lever supporting plate to a point before the circumferential plate or the sub guiding shaft. The extended notch near main guiding shaft may be formed from the lens rim boundary to a point before the circumferential plate or the main guiding shaft. Further, the reinforcing recess and small openings formed on the plates may be formed on any one of the plates as long as problems do not arise in the functions and strength of the cover.

[Explanations of Letters or Numerals]

Figure 1:
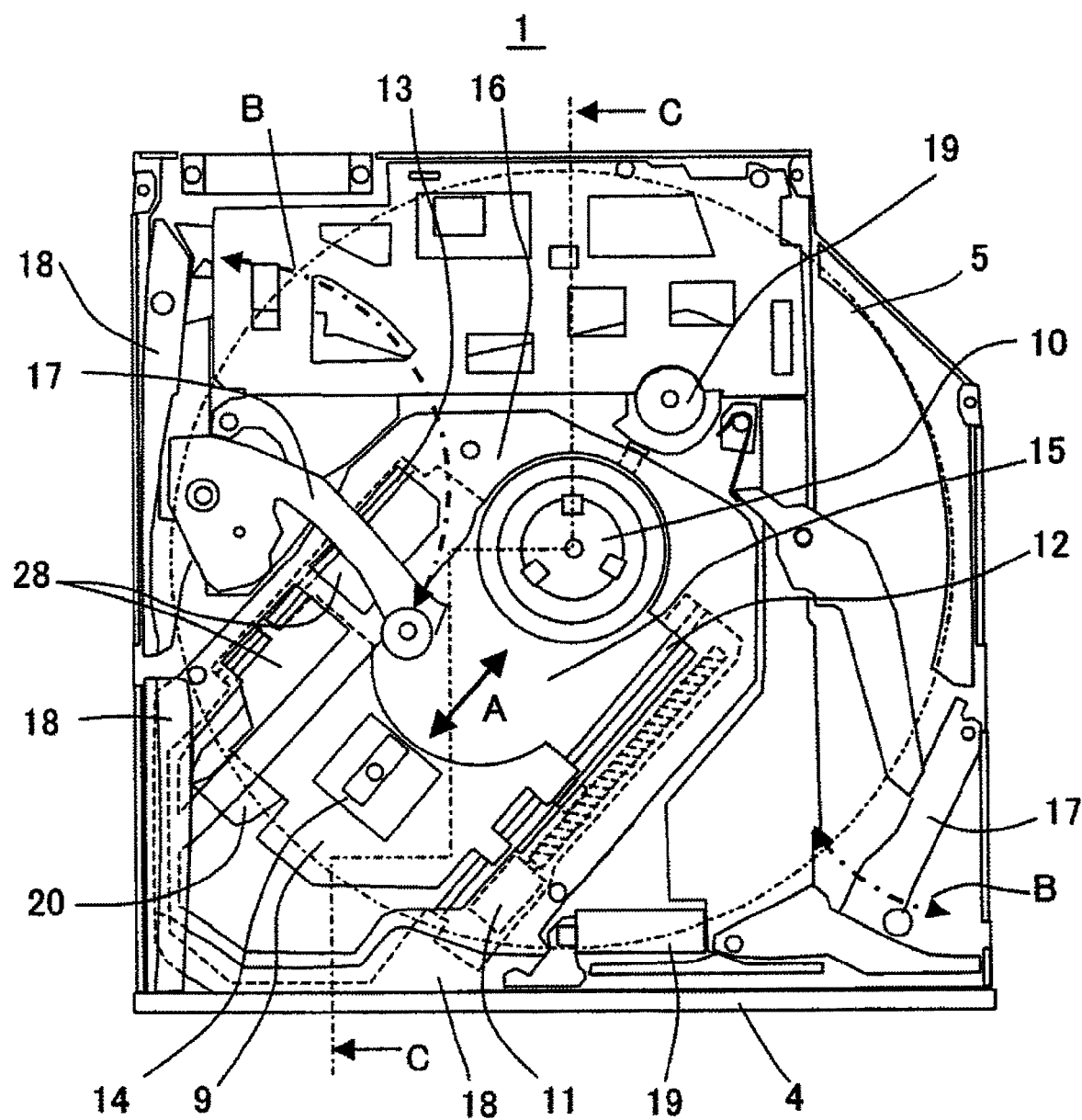
FIG. 1 is a plan view showing the overall configuration of an embodiment of an optical disc apparatus without a top cover according to the present invention.
Figure 2:
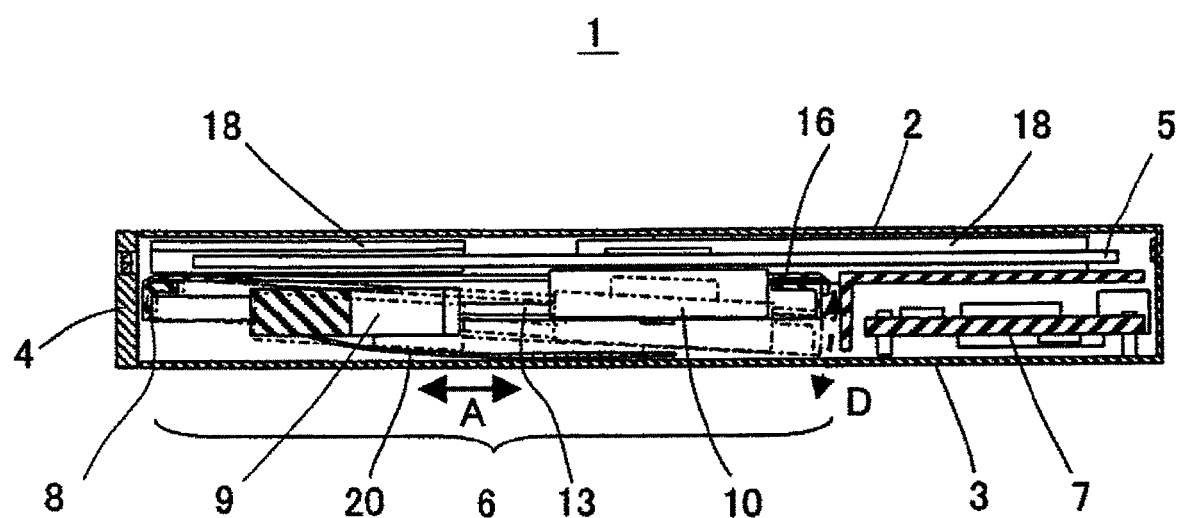
FIG. 2 is a sectional view taken along line C-C of FIG. 1.
Figure 3:
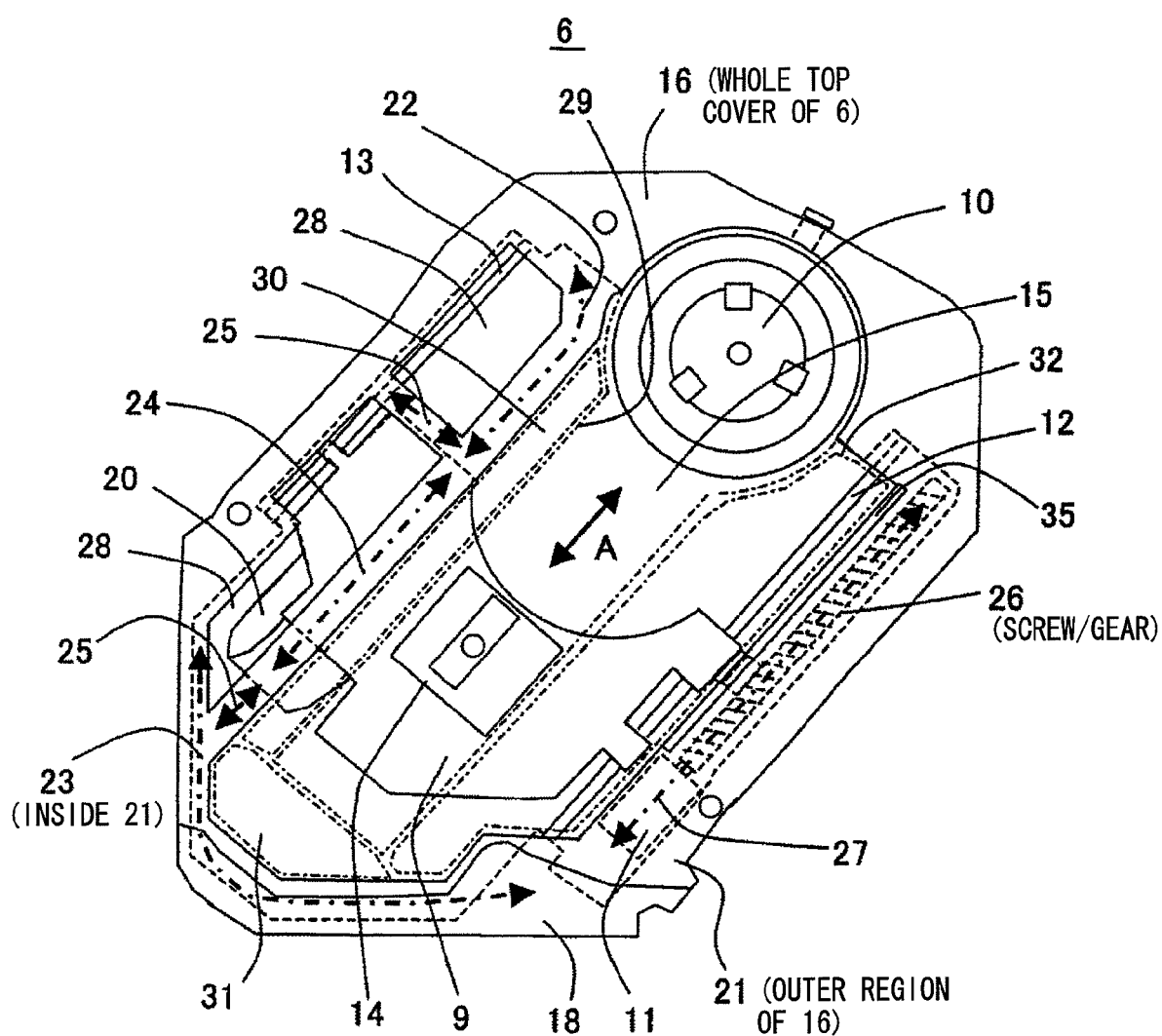
FIG. 3 is a plan view showing a unit mechanism of the optical disc apparatus shown in FIG. 1.
Figure 4:
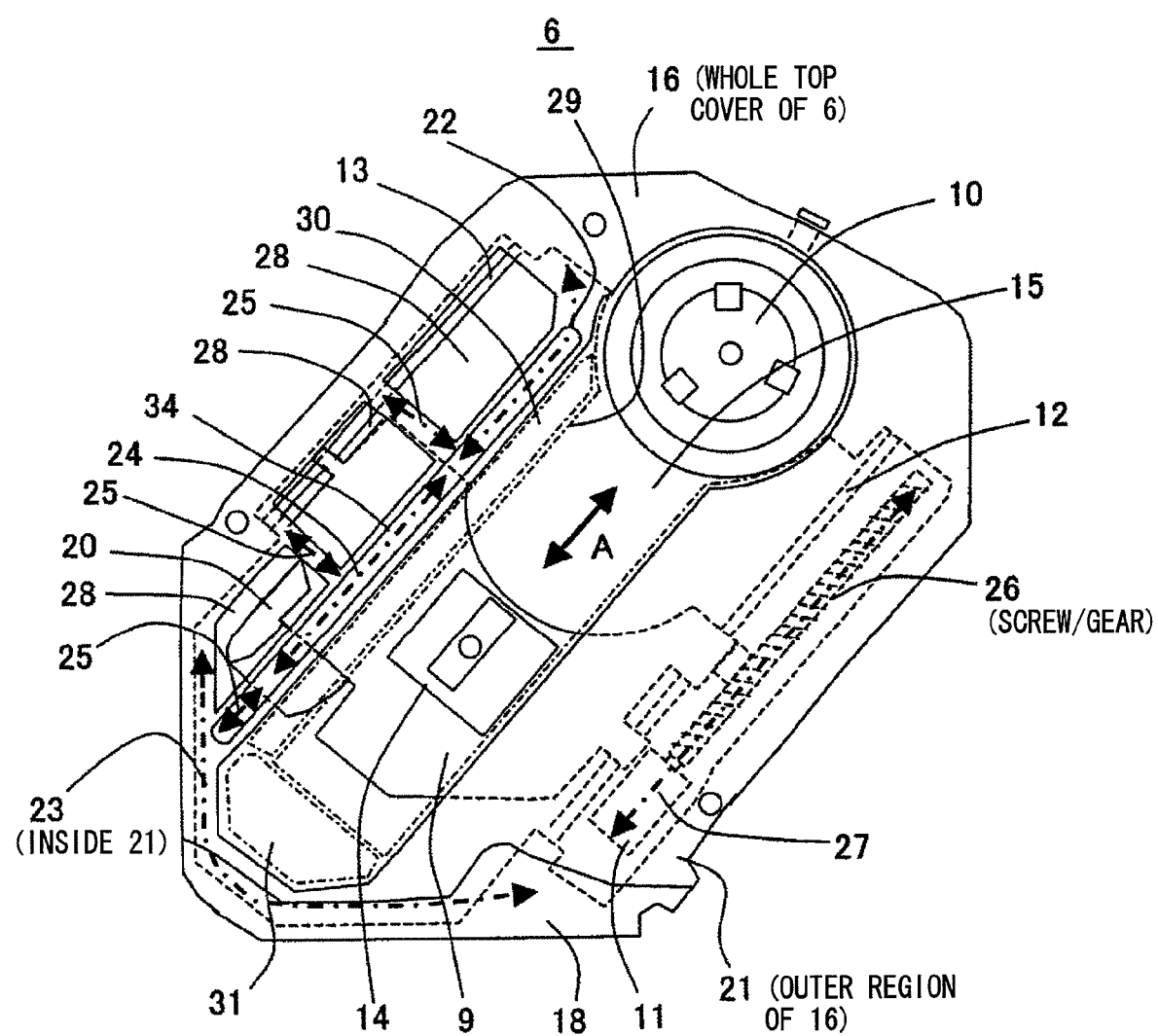
FIG. 4 is a plan view showing a unit mechanism of another embodiment of an optical disc apparatus according to the present invention.
Figure 5:
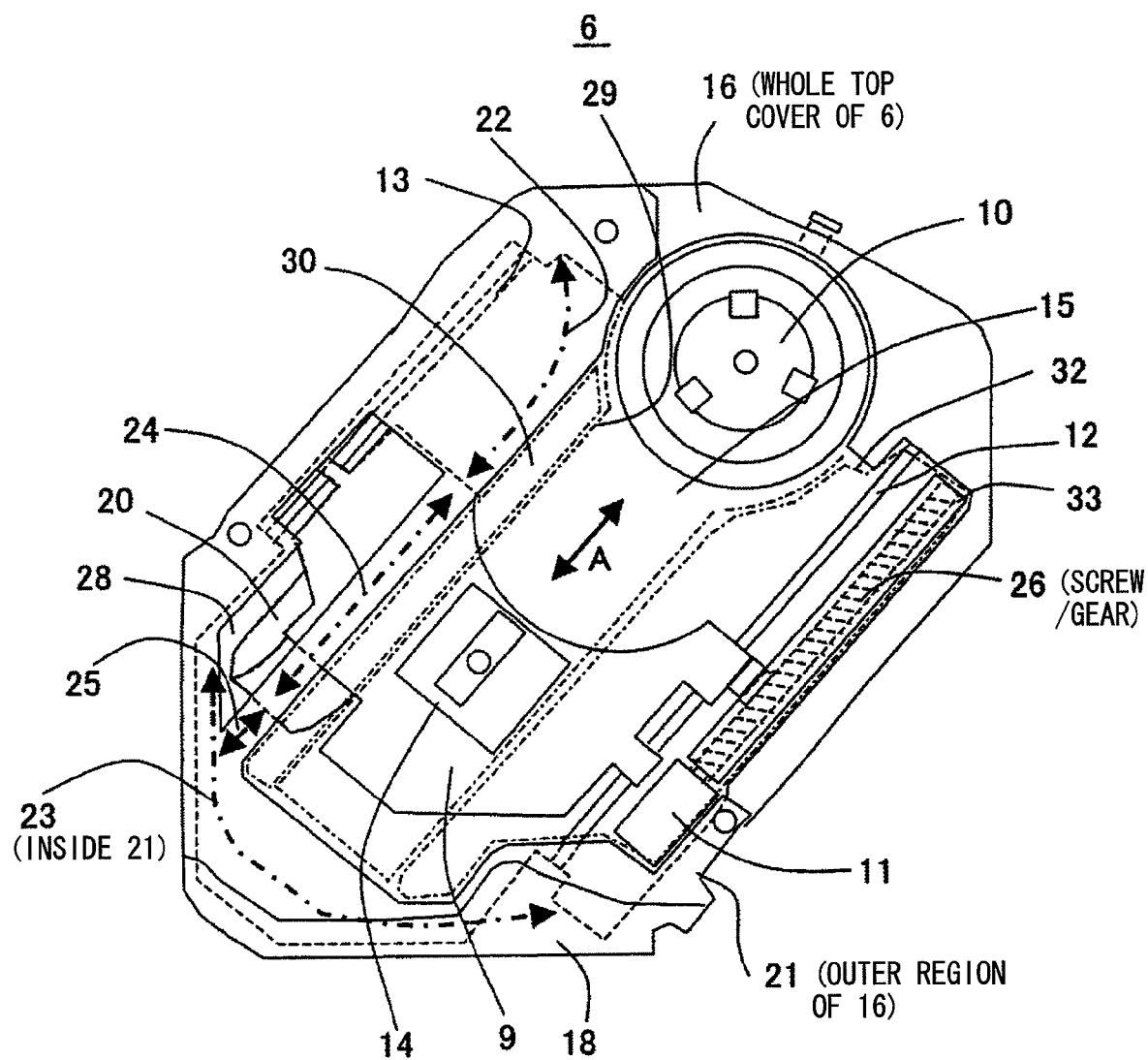
FIG. 5 is a plan view showing a unit mechanism of still another embodiment of an optical disc apparatus according to the present invention.
Figure 6:
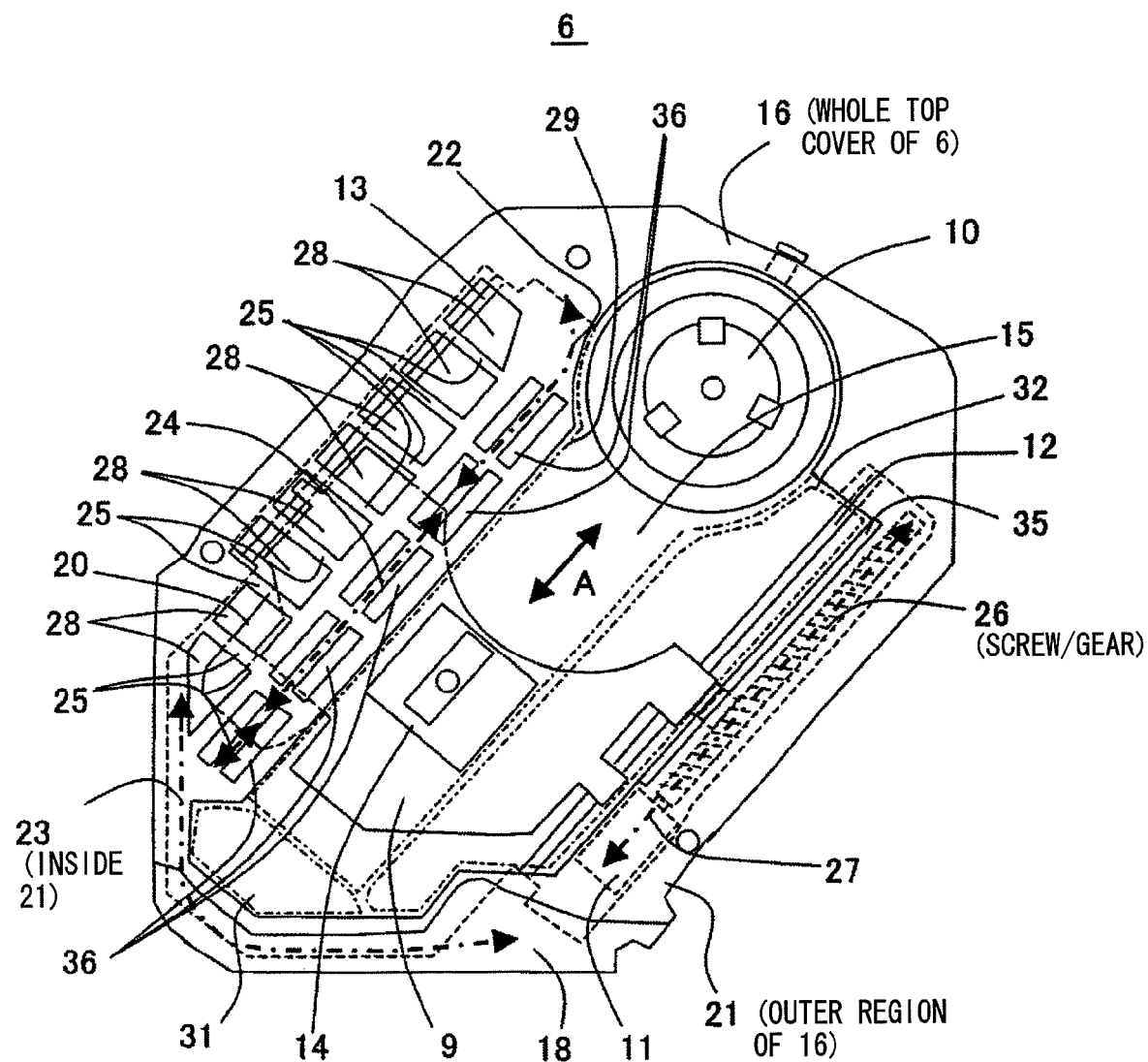
FIG. 6 is a plan view showing a unit mechanism of still another embodiment of an optical disc apparatus according to the present invention.
Figure 7:
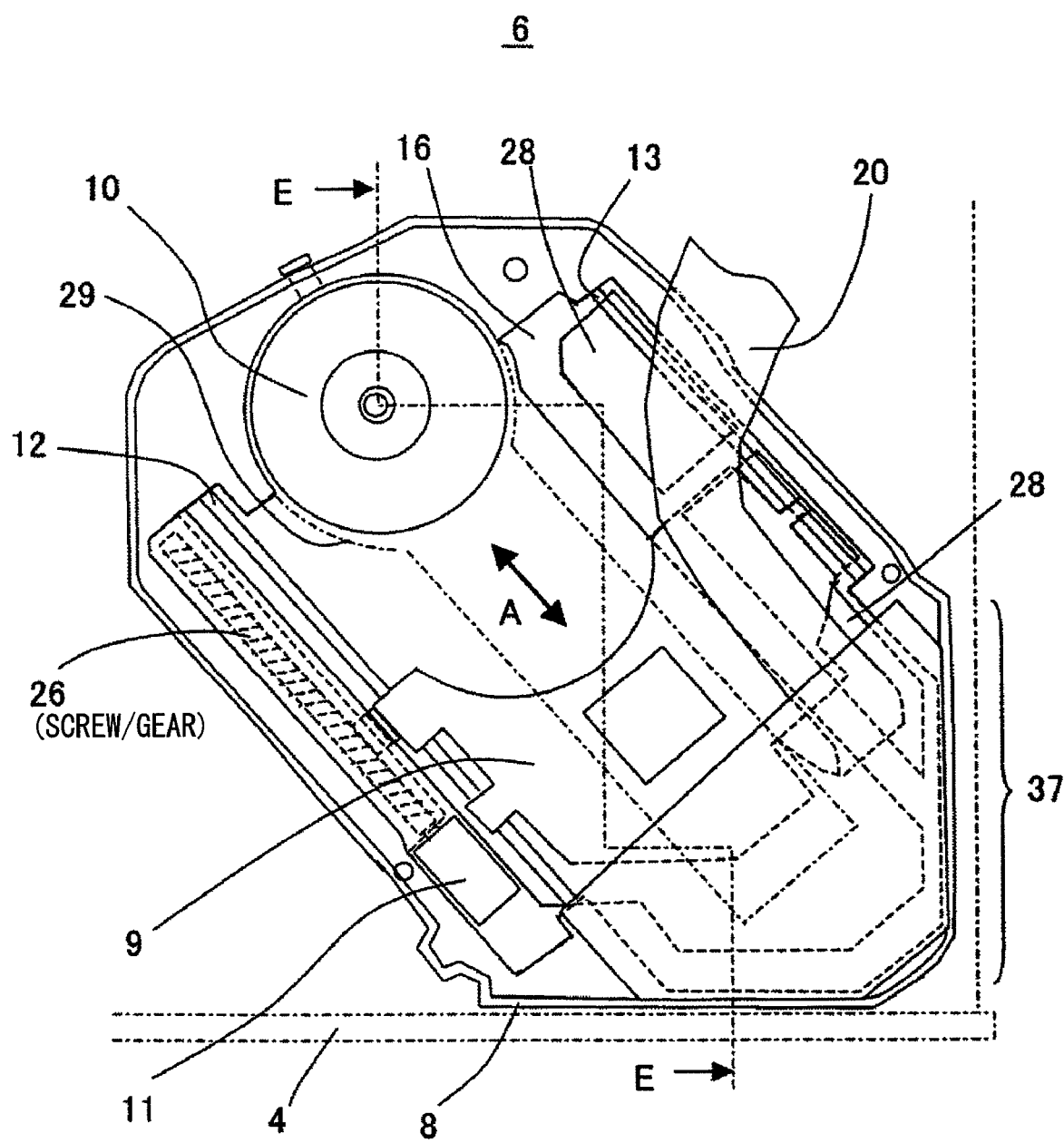
FIG. 7 is a bottom view showing a unit mechanism of still another embodiment of an optical disc apparatus according to the present invention.
Figure 8:
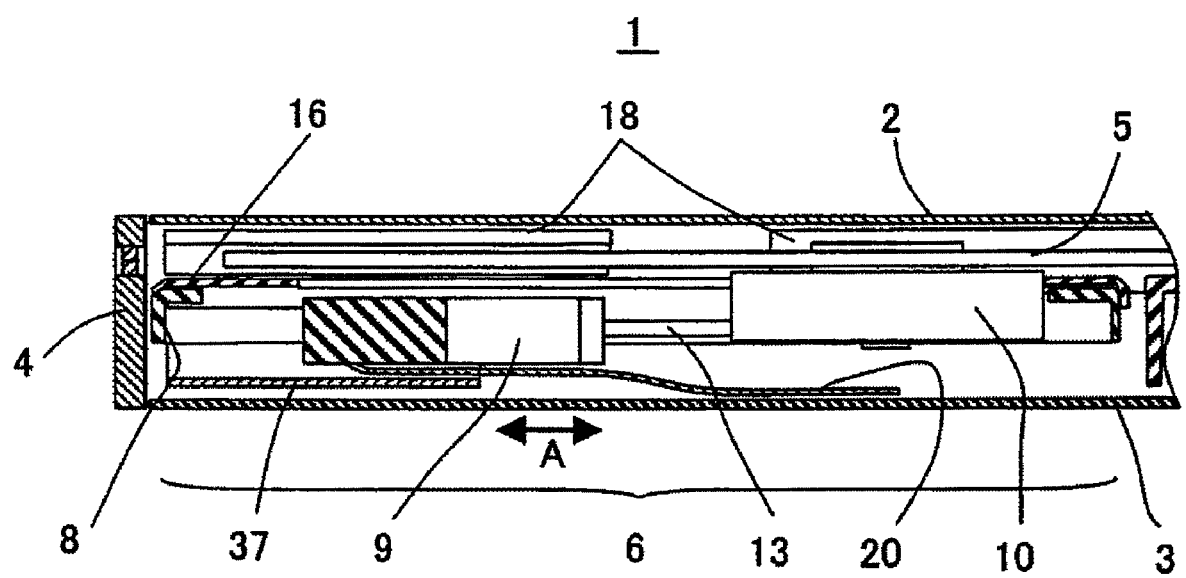
FIG. 8 is a partial side sectional view (taken along line E-E) of the optical disc apparatus shown in FIG. 7.
Figure 9:
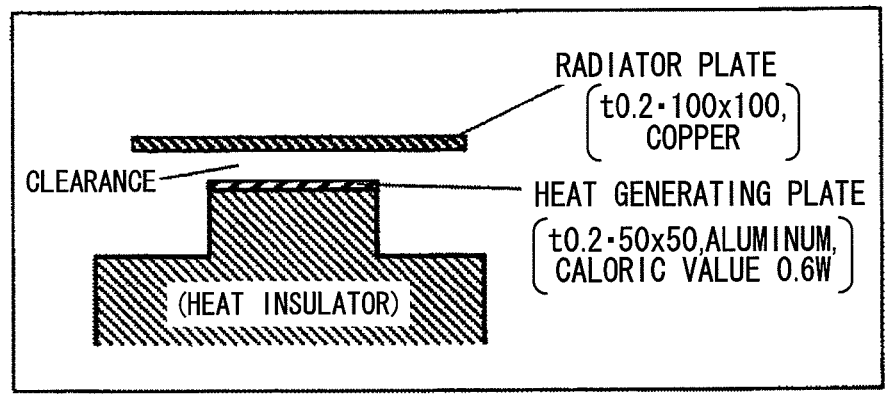
FIG. 9 is an explanatory drawing showing a model test of a noncontact radiator plate according to the present invention.
Figure 9:
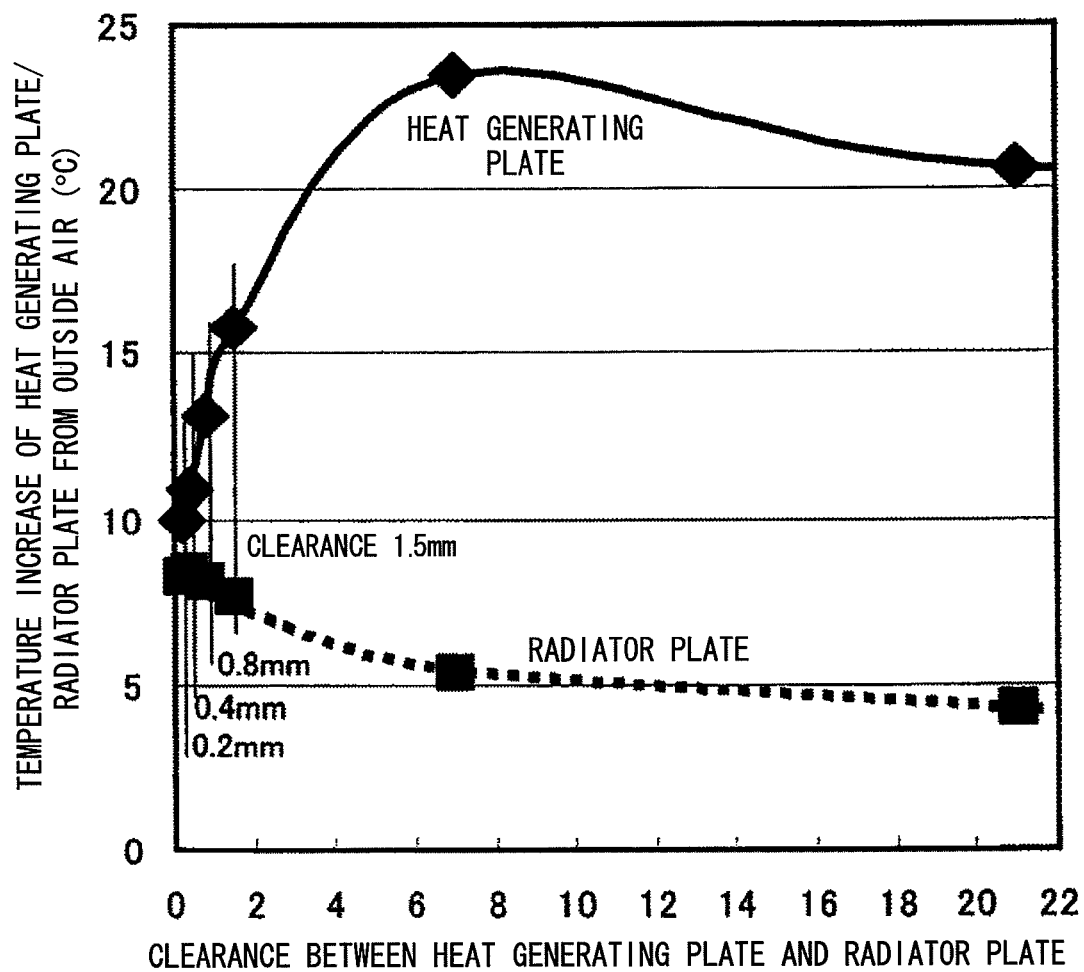

1 . . . optical disc apparatus, 5 . . . disc, 6 . . . unit mechanism, 8 . . . mechanism chassis, 9 . . . pickup, 10 . . . spindle motor, 11 . . . pickup driving part, 12 . . . main guiding shaft, 13 . . . sub guiding shaft, 14 . . . objective lens peripheral part, 15 . . . central opening, 16 . . . unit cover, 17 . . . driving lever, 18 . . . guiding part, 19 . . . unit mechanism tilting part, 20 . . . flexible printed circuit board for pickup, 21 . . . circumferential plate, 22 . . . lever supporting plate, 23 . . . disc guiding plate, 24 . . . flexible printed circuit board holding plate, 25 . . . reinforcing plate, 26 . . . sliding part, 27 . . . driving part covering plate, 28 . . . ventilating opening near sub guiding shaft, 29 . . . lens rim boundary, 30 . . . extended notch near sub guiding shaft, 31 . . . outer extended notch, 32 . . . extended notch near main guiding shaft, 34 . . . reinforcing recess, 5 . . . hood part, 36 . . . small opening, 37 . . . partial under cover

The invention claimed is:

1. An optical disc apparatus, comprising:
a housing;
a spindle motor for rotating a disc;
a pickup including a laser diode, an objective lens, and an optical system to perform optical recording/reproduction on the disc;
a circuit board disposed on an opposite side from a disc-facing side at a back of an inside of the housing;
a flexible printed circuit board for pickup, for connecting the pickup and the circuit board;
a guiding mechanism including a pickup driving part for transmitting force to part of a side of the pickup such that the pickup can move between an inner side and an outer side of a radial direction of the disc, a main guiding shaft disposed near the pickup driving part to guide a movement of the pickup, and a sub guiding shaft disposed on an opposite side from the pickup driving part to guide the movement of the pickup;
a mechanism chassis in which the spindle motor and the guiding mechanism are fixed;

a unit cover covering the disc-facing side of the mechanism chassis, the unit cover including a central opening corresponding to a moving range of an objective lens peripheral part of the pickup and a rotating part of the spindle motor;

a unit mechanism including the spindle motor, the pickup, the guiding mechanism, the mechanism chassis, and the unit cover, the unit mechanism being disposed in the housing; and a loading mechanism including a driving lever and a guiding part which load or eject the disc by moving between a front of the housing and a part near the spindle motor while supporting the outer edge of the disc, and a unit mechanism tilting part for mounting or dismounting the disc on the spindle motor by moving up or down the spindle motor of the unit mechanism against the disc placed near the spindle motor, the loading mechanism being disposed in the housing;

wherein the unit cover comprises:

a circumferential plate which extends along a circumference or a part of the circumference of an end face of the disc-facing side of the mechanism chassis and is placed to cover or contact at least a part of a width direction orthogonal to a circumferential direction on each part of the end face of the mechanism chassis;

a lever supporting plate disposed to be extended from the circumferential plate such that the lever supporting plate covers a part of a track or an entire track of an outer region of a driving lever moving inside the mechanism chassis in the loading mechanism, the driving lever being disposed between the sub guiding shaft and the objective lens peripheral part of the pickup and on an inner side of a disc, and rotating so as to protrude to the disc-facing side of the unit cover;

a disc guiding plate which extends slightly inward from the circumferential plate on a position between a front of the sub guiding shaft and a front of the housing or the objective lens peripheral part of the pickup on the end face of the disc-facing side of the mechanism chassis, the disc guiding plate guiding the disc while sliding a recording surface of the disc in surface contact during loading or ejection of the disc;

a flexible printed circuit board holding plate disposed between the sub guiding shaft and the objective lens peripheral part of the pickup and outside of a middle of the radial direction of the disc, the flexible printed circuit board holding plate covering, along the radial direction of the disc with a width smaller than that of the flexible printed circuit board for pickup, a range in which the flexible printed circuit board for pickup is protruded to the disc-facing side by a movement of the pickup;

a reinforcing plate for connecting at least one of a pair of the flexible printed circuit board holding plate and the circumferential plate and a pair of the lever supporting plate and the circumferential plate in a direction substantially perpendicular to the moving direction of the pickup and a pair of the flexible printed circuit board holding plate and the disc guiding plate substantially in the moving direction of the pickup, and combining the plates into a cover; and at least one ventilating opening near sub guiding shaft disposed between the sub guiding shaft and the objective lens peripheral part of the pickup, the ventilating opening near sub guiding shaft being disposed in a range of the flexible printed circuit board holding plate and the lever supporting plate in the moving direction of the pickup and in a range from the flexible printed circuit board holding plate or the lever supporting plate substantially to the circumferential plate or the sub guiding shaft in a direction substantially orthogonal to the moving direction of the pickup.

2. The optical disc apparatus according to claim 1, wherein the unit cover comprises an extended notch near main guiding shaft provided in a limited range from a position corresponding to a boundary on the main guiding shaft of the central opening to the circumferential plate or the main guiding shaft.

3. The optical disc apparatus according to claim 2, wherein the extended notch near main guiding shaft of the unit cover is disposed between the main guiding shaft and the objective lens peripheral part of the pickup, and the central opening is extended substantially to the circumferential plate and the main guiding shaft on the main guiding shaft from a lens peripheral boundary corresponding to a moving range of the objective lens peripheral part of the pickup.

4. The optical disc apparatus according to claim 1, wherein the unit cover comprises a driving part cover plate extended inward from the circumferential plate disposed between the objective lens peripheral part of the pickup and the main guiding shaft, the driving part cover plate covering a sliding part on the pickup driving part of the guiding mechanism.

5. The optical disc apparatus according to claim 4, further comprising a hood part formed by diagonally bending, in an opposite direction from the disc-facing side, an end on the main guiding shaft of the driving part cover plate of the unit cover such that the hood part does not interfere with a component near the pickup driving part of the pickup.

6. The optical disc apparatus according to claim 1, wherein the unit cover comprises an extended notch near sub guiding shaft, an outer extended notch, or both of the notches between the sub guiding shaft or the outer side of the disc and the objective lens peripheral part of the pickup such that the central opening is extended to the sub guiding shaft or the outer side of the disc from a lens peripheral boundary corresponding to a moving range of the objective lens peripheral part of the pickup.

7. The optical disc apparatus according to claim 1, further comprising a small opening in at least one of the circumferential plate, the lever supporting plate, the disc guiding plate, the flexible printed circuit board holding part, and the reinforcing plate of the unit cover, the small opening being smaller than the ventilating opening near sub guiding shaft.

8. The optical disc apparatus according to claim 1, further comprising a partial under cover fixed on the mechanism chassis so as to come close to an underside of the pickup in a noncontact manner, on a part corresponding to an outer side of the moving direction of the pickup in a range in which the pickup does not come into contact with an underside of the housing in a state in which the spindle motor is moved down by the loading mechanism in an opposite direction from the disc-facing side of the mechanical chassis.

9. The optical disc apparatus according to claim 1, further comprising a reinforcing recess in at least one of the flexible printed circuit board holding plate, the lever supporting plate, and the reinforcing plate of the unit cover, the reinforcing recess having a step height as large as the thickness of the unit cover and extending along a length of each of the plates.

* * * * *